(12) United States Patent
Meyers

(10) Patent No.: US 9,189,661 B1
(45) Date of Patent: Nov. 17, 2015

(54) APPARATUS FOR ESTABLISHING A MESH NETWORK FOR REEFER SENSOR ARCHITECTURE

(75) Inventor: Richard C. Meyers, Longboat Key, FL (US)

(73) Assignee: GlobalTrak, LLC, Sterling, VA (US)

( * ) Notice: Subject to any disclaimer, the term of this patent is extended or adjusted under 35 U.S.C. 154(b) by 240 days.

(21) Appl. No.: 13/310,638

(22) Filed: Dec. 2, 2011

Related U.S. Application Data

(60) Provisional application No. 61/420,226, filed on Dec. 6, 2010.

(51) Int. Cl.
| | |
|---|---|
| *H04Q 5/22* | (2006.01) |
| *G06K 7/00* | (2006.01) |
| *G08B 13/14* | (2006.01) |
| *E05B 73/00* | (2006.01) |
| *G06K 19/07* | (2006.01) |

(52) U.S. Cl.
CPC .......... *G06K 7/0008* (2013.01); *E05B 73/0017* (2013.01); *G06K 19/0723* (2013.01); *G08B 13/1436* (2013.01)

(58) Field of Classification Search
CPC .......... G08B 13/2434; G08B 13/2462; G08B 13/246; G08B 13/2417; G08B 13/2482; G06Q 10/087; G06Q 10/08; E05B 73/0017
USPC ................ 340/10.1–10.6, 571–572.9, 539.1, 340/539.19, 539.22
See application file for complete search history.

(56) References Cited

U.S. PATENT DOCUMENTS

| | | | |
|---|---|---|---|
| 6,826,514 B1 * | 11/2004 | Antico et al. ................. | 702/188 |
| 2003/0052776 A1 * | 3/2003 | Richards ....................... | 340/539 |
| 2009/0026263 A1 * | 1/2009 | Schmid et al. ................ | 235/385 |
| 2009/0160646 A1 * | 6/2009 | Mackenzie et al. ........ | 340/572.1 |
| 2009/0237258 A1 * | 9/2009 | Heck et al. .................... | 340/585 |
| 2011/0291828 A1 * | 12/2011 | Walker et al. ............ | 340/539.27 |
| 2012/0109404 A1 * | 5/2012 | Pandey et al. ................ | 700/299 |

* cited by examiner

*Primary Examiner* — George Bugg
*Assistant Examiner* — Sharmin Akhter

(57) ABSTRACT

The present invention provides a system and apparatus for monitoring temperature and airflow from multiple sensors node for maintaining proper conditions within a refrigerated tractor-trailer unit or reefer. The system provides a mesh network of multiple sensors, which communicate between sensors and with a processing unit of a reefer unit for monitoring the condition of transported goods.

2 Claims, 6 Drawing Sheets

APPARATUS FOR ESTABLISHING A MESH NETWORK FOR REEFER SENSOR ARCHITECTURE

PRIORITY CLAIM

The present invention claim priority to U.S. Provisional Application No. 61/420,226, filed Dec. 6, 2010. No new matter has been added.

BACKGROUND OF THE PRESENT INVENTION

1. Field of the Present invention

The present invention relates to an advanced sensor architecture for use in refrigerated tractor trailer units ("reefers"). More specifically, the present invention relates to a mesh network of multiple sensors which communicate between sensors and with a processing unit of a reefer unit.

2. Description of Related Art

Heat energy can enter a closed container, like a trailer, in many ways. It can be conducted through trailer walls. It can flow around gaps in door openings or through cracked door seals. Heat can be conducted in through the trailer floor or out through the ceiling. A structural member or a steel bolt will act as a channel for heat if it passes through from outside to inside. Better reefer trailers have internal structures for rubrails and E-tracks that are separated and insulated from the outside walls.

Other sources of heat are often the loads themselves. Exothermic foods such as chocolate ice cream, broccoli and beans will actually increase load temperature.

Mobile refrigeration units are designed to maintain, not change temperature. Reefers are not designed to chill down field loads from 100 degrees ambient temperature to 40 degrees storage temperature. They are designed to remove any increased heat and to keep product temperature stable.

Reefers also control humidity by condensing moisture from the air. To do these things, refrigeration units require four things: thermal integrity of the trailer to prevent the inflow of additional heat; sufficient BTU capacity to remove the expected amount of heat; sufficient airflow, measured in cubic feet per minute (cfm), to exchange the air inside a trailer about once every minute; and sufficient air velocity to move the air through the trailer and over and through the load.

The complex nature of reefer units creates frequent breakdowns which result in loss of products from spoilage. Recent research done by the University of Florida, in cooperation with the Florida and the U.S. Department of Agriculture, indicates that 46 percent of the drivers surveyed had loss claims, averaging one claim in a little over two years. Claims from high temperature, gases and humidity averaged more than $7,500. Yet, according to researchers, more than a third of drivers rarely or never check cargo temperatures before accepting a load, and more than half rarely or never use any recording thermometer to monitor the load in transit.

In theory, refrigerated loads come from temperature-controlled storage, spend no time on docks or in higher temperatures and the interior of a pre-cooled trailer maintains its temperature even when its doors are opened in the yard and the trailer is backed into its dock. In actuality, loads are often too warm when they are loaded, drivers don't shut their reefers off before opening doors and debris in the floor channels blocks airflow.

When a pre-cooled reefer operates with the doors open; warm, humid outside air is sucked in. The moisture hits the evaporator, which ices up. That cuts off cold airflow, while warm air fills the previously pre-cooled trailer. The same effect results when debris gets into return air passages, blocking the flow of cold air. The function of a refrigeration unit is to maintain the temperature of a load, which means removing heat from any sources, both from inside the load and outside. When cooling, the load is the warmer object, and the air surrounding the load is, or should be, cooler. That cooler air must be in contact with the load in order for it to remove heat energy. If the air does not flow then the temperature of the air in reefer unit will quickly reach the same temperature as the load. As the load warms up, so will the air. Then no cooling, not even temperature maintenance, will occur.

During the entire process of heating and cooling, the interior of the reefer is not actively monitored or managed. Further, all of the items within the reefer are treated the same and no record is kept for any single item being transported.

SUMMARY OF THE PRESENT INVENTION

To address the problems and limitations noted above, an apparatus for establishing a mesh network within a reefer is provided. The object of the present invention is to enable shipping companies to monitor temperature and moisture levels while the load is in transit by establishing a mesh network of sensor controls throughout a reefer unit. The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
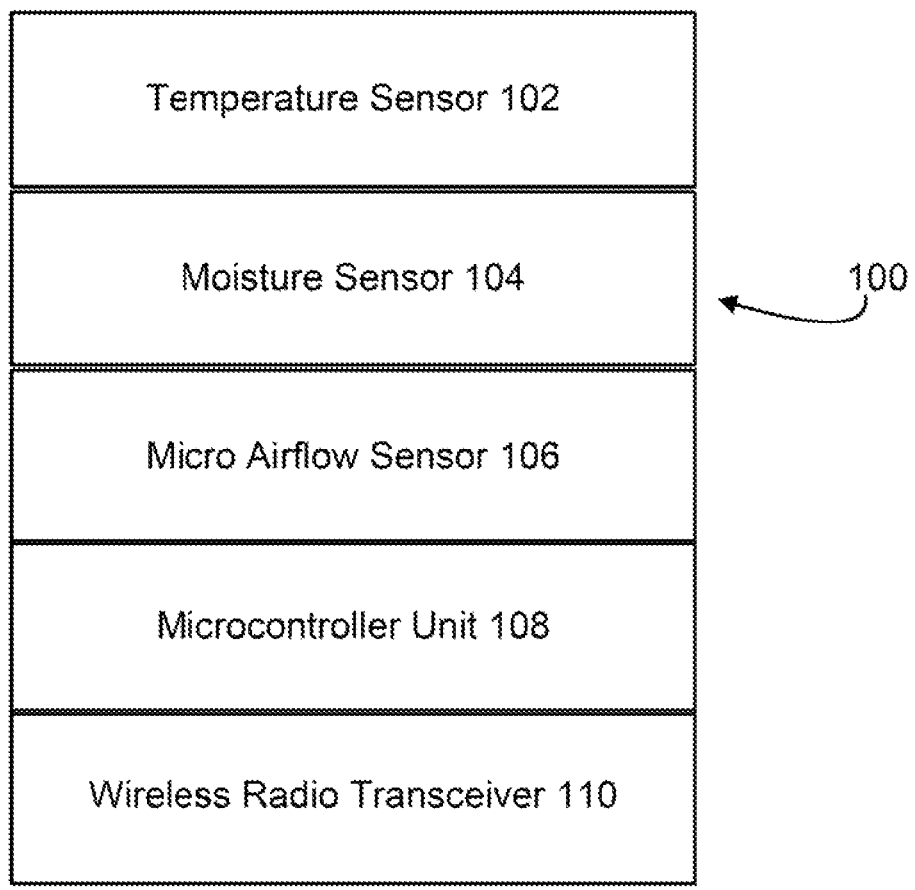
FIG. 1 is a block diagram of wireless reefer sensor unit according to an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

With reference now to FIG. 1, a block diagram of a wireless reefer sensor unit according to an embodiment of the present invention will now be discussed. As shown in FIG. 1, a wireless reefer sensor unit 100 preferably includes a temperature sensor 102, preferably with a means of recording and displaying temperature, a moisture sensor 104, a micro airflow sensor 106, a microcontroller unit 108 and a wireless radio transceiver 110. A plurality of wireless reefer sensor units as described in FIG. 1 may be positioned in locations that are effected by fluctuations in temperature and air flow.

Figure 2:
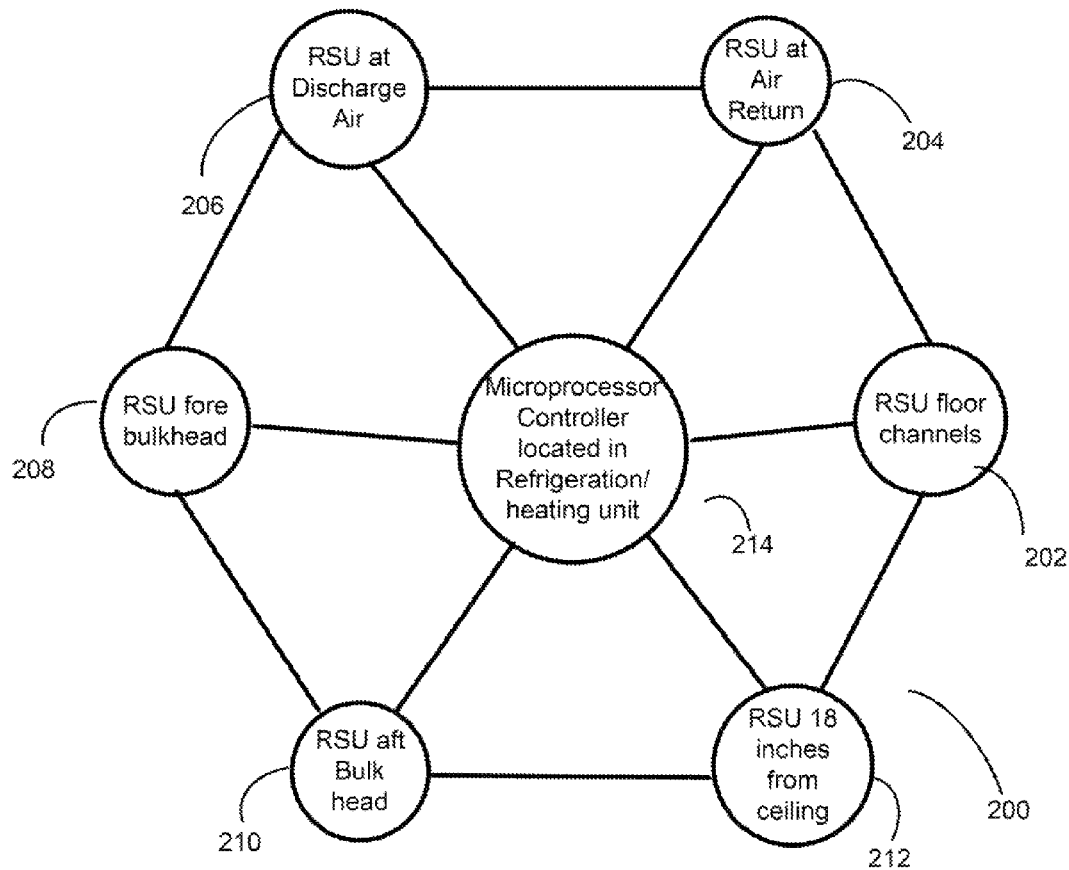
FIG. 2 is a diagram of a preferred wireless architecture according to an embodiment of the present invention.

With reference now to FIG. 2, a diagram of a preferred wireless architecture according to an embodiment of the present invention will now be discussed. As shown in FIG. 2, a full mesh network architecture 200 is provided where each wireless node is a reefer sensor unit (RSU) as described in FIG. 1, and has a means of wirelessly connecting to each of the other nodes in the network. According to one preferred embodiment of the present invention, the reefer sensor units (RSU) may be positioned as shown in FIG. 2: the floor channels 202, the fore bulkhead 208, the aft bulkhead 210, the load line 212, the discharged air vent 206, and the air return 204. Preferably, each RSU node will communicate with one another and the Microprocessor Controller located in the refrigeration/heating unit 214.

Figure 3:
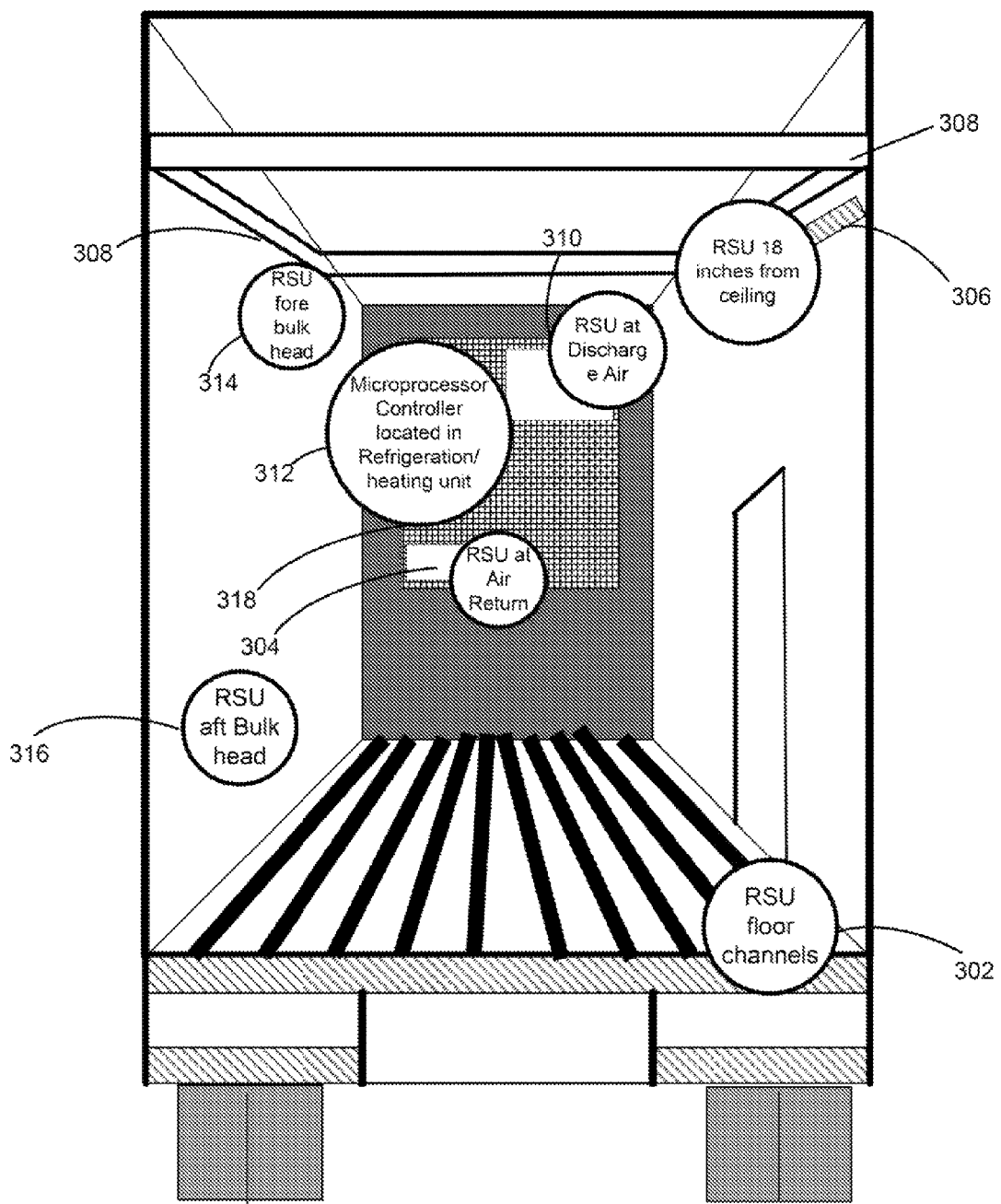
FIG. 3 is a functional configuration according to an embodiment of the present invention.

With reference now to FIG. 3, a functional configuration according to an embodiment of the present invention will now be discussed. As shown in FIG. 3, the rear view of the inside of a reefer trailer showing placement of all reefer sensor units within the trailer, comprising a mesh network of reefer sensor units, a stored bulk head 308, and a nose mount refrigeration/heating unit 318. The mesh network as shown comprises a RSU positioned in the floor channels 302, a RSU positioned in the aft bulk head compartment 316, a RSU positioned in the fore bulk head compartment 314, a RSU positioned at the air discharge 310, a RSU positioned at the air return, and at least one RSU positioned at or above the eighteen inch load line 306. Each RSU can interrogate and communicate with any other RSU unit and the Microprocessor Controller located in the refrigeration/heating unit 312.

Figure 4:
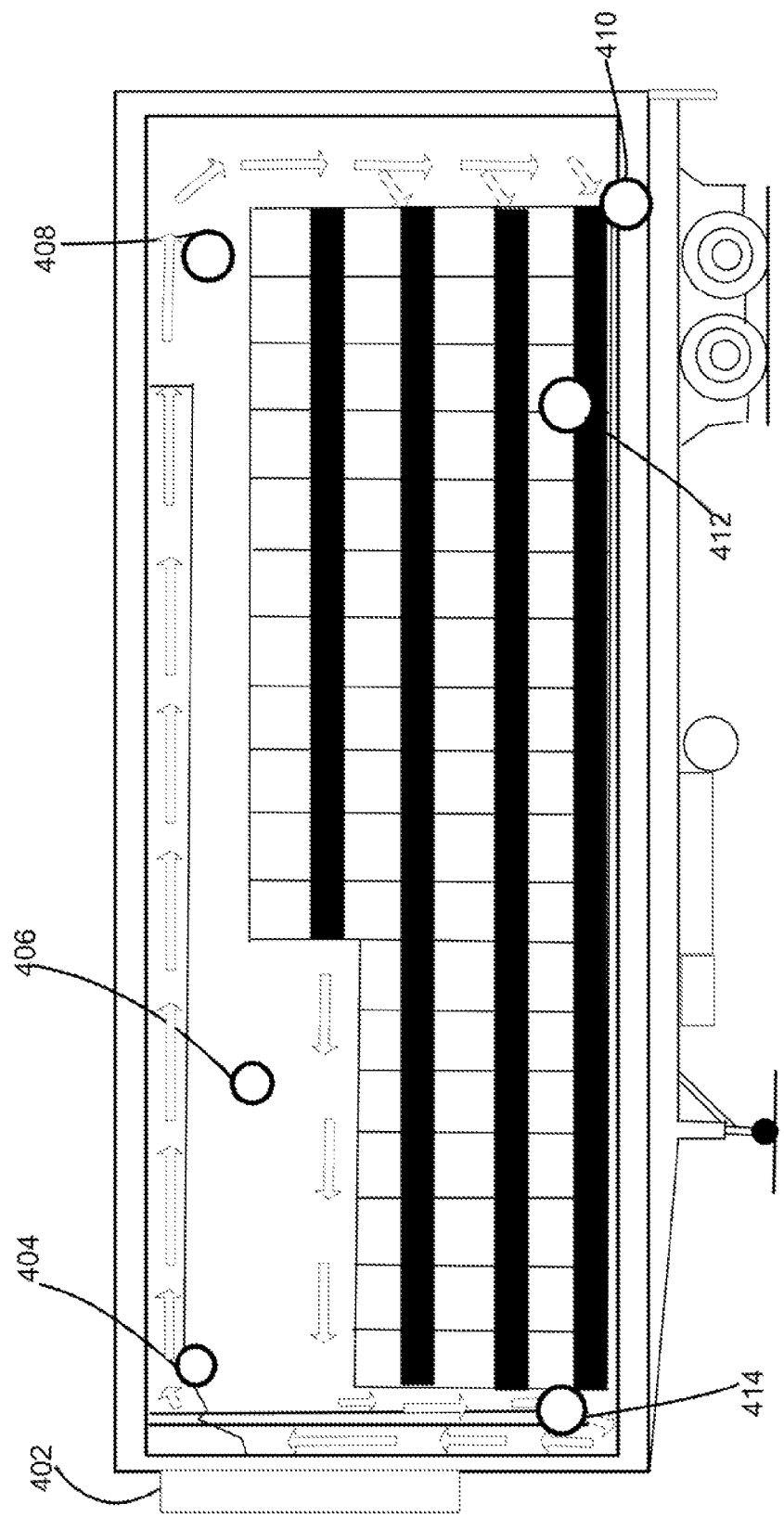
FIG. 4 is a side view functional configuration according to an embodiment of the present invention.

With reference now to FIG. 4, a side view of a functional configuration according to an embodiment of the present invention will now be discussed. As shown in FIG. 4, a loaded top airflow reefer trailer unit is provided illustrating an example product stacking pattern ensuring good air circulation throughout the entire load and preferred placement of the reefer sensor units according to one embodiment of the present invention. The mesh network as shown comprises an RSU positioned in the floor channels 410, a RSU positioned in the aft bulk head compartment 412, an RSU positioned in the fore bulk head compartment 406, an RSU positioned at the air discharge 404, an RSU positioned at the air return 414, and at least one RSU positioned at or above the eighteen inch load line 408. Preferably, each RSU can interrogate and communicate with any other RSU unit and the microprocessor controller located in the refrigeration/heating unit 402. The reefer sensor units in the mesh network are positioned to detect any decline in adequate air flow parameters, areas of low or high moisture outside acceptable parameters, and any temperature fluctuations throughout the trailer. The reefer sensor units will detect and report any conditions outside acceptable parameters to microcontroller unit for automatic adjustments. All sensors can be pre-programmed to take measurement, timestamp and store data, and alert remote monitoring station to conditions outside acceptable parameters given the load data.

Further, the system may be configured to read and record data to and from RFID tagged items and to use the data from such items to adjust and control the necessary temperature settings. Such data from the RFID tags may be further used to determine and detect items which may not have been properly stored. Further, the data may be used to determine points in the supply chain which are consuming more energy such as warehouses which are not keeping items stored at the correct temperature.

Figure 5:
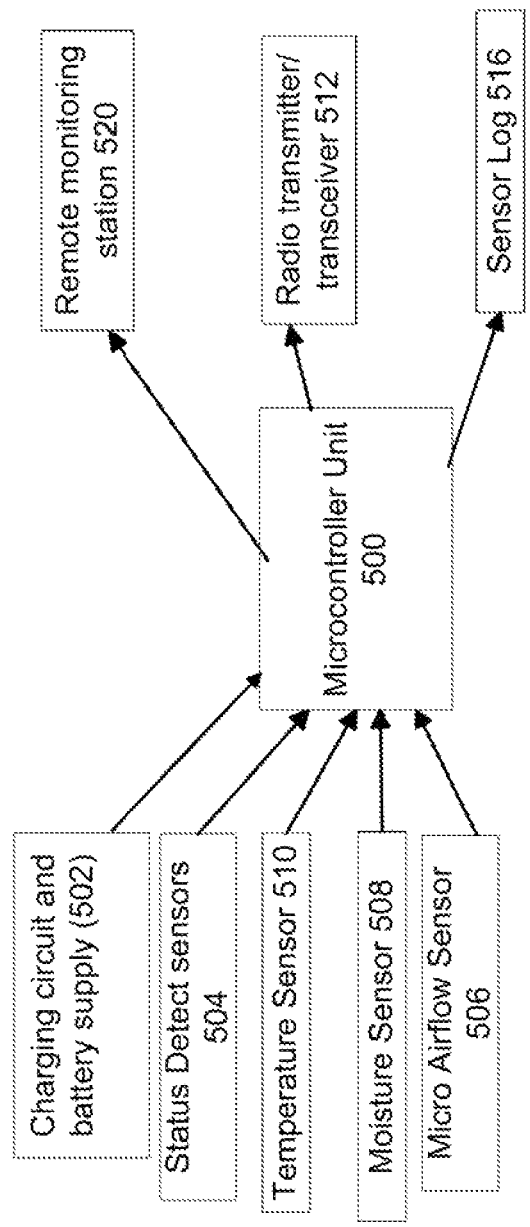
FIG. 5 is an electrical wiring diagram of a micro-processing unit according to an embodiment of the present invention.

With reference now to FIG. 5, an electrical wiring diagram of a microcontroller unit according to an embodiment of the present invention will now be discussed. A microcontroller unit 500 receives input from a charging circuit and battery cells 502, a temperature sensor 510, a moisture sensor 508, a micro airflow sensor 506, and status detect sensors 504. The microcontroller unit 500 then assesses all the information and sends out signals to a radio transmitter/transceiver 512, a sensor log 516, and a remote monitoring station 520. Data from these sensors is processed, stored, and acted upon by the microcontroller unit 500.

Preferably, the reefer sensor unit of the present invention includes circuitry and digital ports to connect to existing electrical and sensor management systems of reefer trailers previously configured with embedded circuitry. In operation, a microcontroller unit 500 is preferably programmed to routinely scan the condition of each sensor to ensure operability.

Figure 6:
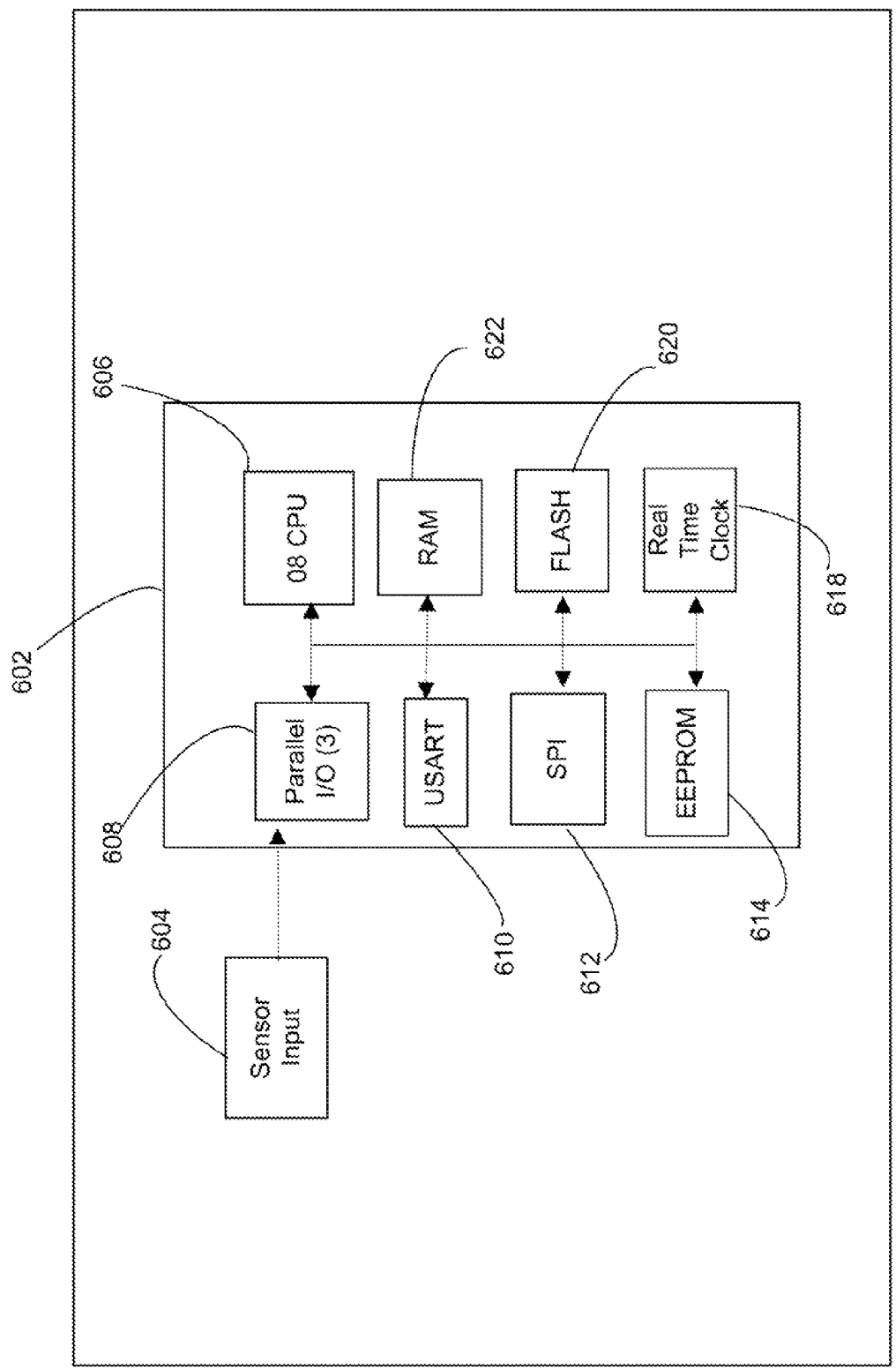
FIG. 6 is a block diagram of a sensor control unit according to an embodiment of the present invention.

With reference now to FIG. 6, it is preferred that the microcontroller unit 602 incorporates a microprocessor 604, a real time clock 618, a general purpose Input/Output port to support external peripheral control 608, a Universal Synchronous/Asynchronous Receiver Transmitter (USART) 610, a Serial Port Interface (SPI) 612, and memory such as RAM 622, FLASH memory 620, and EEPROM 614 as shown.

Preferably, the microprocessor 604 used may be a low power, high performance, eight-bit intergrated circuit based on the Motorola HCS08 instruction set. The controller will preferably manage power and host the master date-time clock, communication scheduling and annotation of flash memory records.

Communication System

In accordance with a preferred embodiment of the present invention, the reporting may be made via a wireless connection to a satellite mode to communicate with a satellite system such as Globalstar or Orbcomm. Preferably, such a satellite device will be a device such as the Axxon, AutoTracker, or the like, or a customized Orbcomm VHF satellite GPS tracking communications device which may be adapted with Zigbee interface antenna devices to incorporate them into the overall LAN architecture of the security system; these devices include a satellite transceiver, GPS receiver, a customized Zigbee wireless antenna with a serial (Ax Tracker) or duplex (OrbComm) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

As referred to above, all communications of the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from present invention as needed. For example, as detailed above, each system and subsystem of the present invention may be designed to send, receive, report and request information via the wireless and/or satellite systems so as to continually maintain and update the container systems.

Additional communications with the communications manager are preferably enabled via industry standard wired interfaces, with communications protocols implemented in firmware for future upgrade. These interfaces preferably will include at least two RS-322 compatible serial ports. These alternate serial ports may assist the communications manager to interface with additional remote sensors as well as other local reader/controllers such as an RFID reader or other devices.

Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-mail, HTML and flat text files. After receiving such data, the data fusion center preferably would act to process information to identify anomalies. With this data collected and processed, analyst may calculate statistics and probability of detection models used for decision support. In short, such a data fusion center would preferably provide a consolidated source of information that could be used to assist agencies and shippers.

The present invention provides a real-time delivery tracking solution that solves many system wide problems in the current temperature sensitive product delivery system. By establishing a mesh network of reefer sensors, temperature fluctuations throughout the reefer trailer can be detected and the system adjusted to protect the product. The present invention enables shipping companies to improve quality control and eliminate spoilage by identifying specific problems in load and operational procedures. This level of efficiency translates directly in lower costs and better service.

What is claimed is:

1. An apparatus for establishing a mesh network of two or more sensor elements for monitoring conditions within a closed container, the apparatus comprising:
    a central processing element for receiving sensor data from a plurality of sensors;
    wherein the plurality of sensor elements comprise a sensor, a processing element and a transceiver co-located within a common housing; further wherein the plurality of sensor elements are configured to monitor one or more aspects of the closed container; and further wherein the sensor elements are configured to interrogate and communicate with one or more of the sensor elements within the same closed container;
    wherein the central processing element is configured to analyze sensor data from the plurality of sensor elements and to transmit sensor data to a remote monitoring station, wherein the central processing element analyzes sensor data by receiving, analyzing and processing sensor data to determine whether measured aspects of the container's interior indicated by the sensor data exceed predetermined thresholds;
    wherein the sensor data is received from the plurality of sensor elements and selected sensor data is transmitted to the remote monitoring station based on the analysis of the central processing element;
    wherein the central processing element is configured to adjust sensor settings based on the analysis of the central processing element, wherein the adjusted sensor settings comprise changes to set sensor parameters, wherein the set sensor parameters comprise air flow parameters, moisture level parameters, and temperature parameters; and
    further wherein the central processing element is further configured to assist in creating network connections between sensor elements.

2. An apparatus for establishing a mesh network of two or more sensor elements for monitoring conditions within a closed container, the apparatus comprising:
    a central processing element for receiving sensor data from a plurality of sensors;
    wherein the plurality of sensor elements comprise a sensor, a processing element and a transceiver co-located within a common housing; further wherein the plurality of sensor elements are configured to monitor one or more aspects of the closed container; and further wherein the sensor elements are configured to interrogate and communicate with one or more of the sensor elements within the same closed container;
    wherein the central processing element is configured to analyze sensor data from the plurality of sensor elements and to transmit sensor data to a remote monitoring station, wherein the central processing element analyzes sensor data by receiving, analyzing and processing sensor data to determine whether measured aspects of the container's interior indicated by the sensor data exceed predetermined thresholds;
    wherein the sensor data is received from the plurality of sensor elements and selected sensor data is transmitted to the remote monitoring station based on the analysis of the central processing element;
    wherein the central processing element is configured to adjust sensor settings based on the analysis of the central processing element, wherein the adjusted sensor settings comprise changes to set sensor parameters, wherein the set sensor parameters comprise air flow parameters, moisture level parameters, and temperature parameters; and
    wherein the central processing element is further configured to assist in creating network connections between sensor elements;
    wherein the central processing element is further configured to receive and record RFID data from RFID tagged items; and
    further wherein the central processing element is configured to adjust sensor settings based on analysis of data received from RFID tagged items, wherein the adjusted sensor settings comprise changes to set sensor parameters, wherein the set sensor parameters comprise air flow parameters, moisture level parameters, and temperature parameters.

* * * * *